United States Patent [19]

Yano

[11] Patent Number: 5,117,294
[45] Date of Patent: May 26, 1992

[54] IMAGE PROCESSING METHOD AND SYSTEM

[75] Inventor: Satoshi Yano, Kawasaki, Japan

[73] Assignee: Ricoh Company, Ltd., Tokyo, Japan

[21] Appl. No.: 500,950

[22] Filed: Mar. 29, 1990

[30] Foreign Application Priority Data

Apr. 12, 1989 [JP] Japan .................... 1-90757

[51] Int. Cl.⁵ .................. H04M 1/40; H04M 1/393
[52] U.S. Cl. .................................. 358/447; 358/451
[58] Field of Search ............ 358/497, 481, 456, 463, 358/464; 382/47

[56] References Cited

U.S. PATENT DOCUMENTS

| | | | |
|---|---|---|---|
| 4,280,144 | 7/1981 | Bacon | 358/280 |
| 4,355,337 | 10/1982 | Sekigawa | 358/284 |
| 4,873,577 | 10/1989 | Chamzas | 353/447 |
| 4,975,785 | 12/1990 | Kantor | 358/447 |
| 5,001,576 | 1/1991 | Tanaka et al. | 358/447 |

FOREIGN PATENT DOCUMENTS 283455 3/1980 Fed. Rep. of Germany .
3546337 9/1986 Fed. Rep. of Germany .

Primary Examiner—Edward L. Coles, Sr.
Attorney, Agent, or Firm—Oblon, Spivak, McClelland, Maier & Neustadt

[57] ABSTRACT

A method for converting a first image of a first resolution to a second image of a second resolution comprises steps of detecting a predetermined pattern in the first image, the predetermined pattern contains a stepped boundary and includes at least a central picture element having a first content and formed by the first picture element, the central picture element is defined by a first edge extending in a first direction and a second edge extending in a second direction in corresponding to the step, dividing the central picture element into a first sub-picture element and a second sub-picture element each having a same size, and inverting the content of one of the first and second sub-picture elements depending on the detected predetermined pattern.

6 Claims, 11 Drawing Sheets

FIG. 1 PRIOR ART
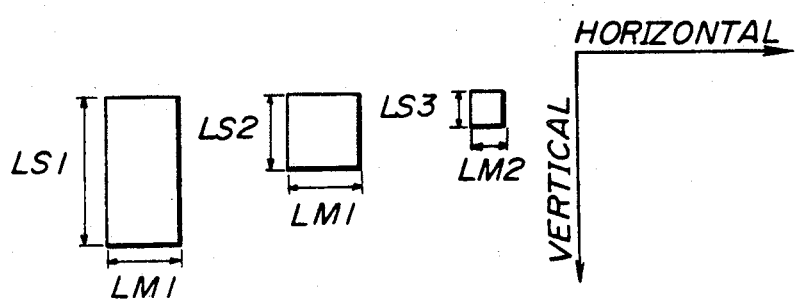
FIG. 2 PRIOR ART
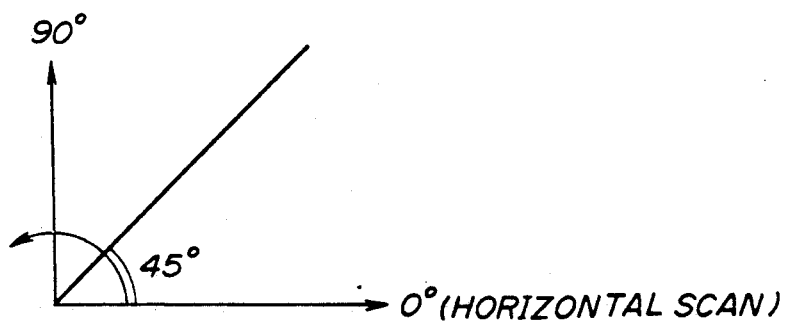
FIG. 3A PRIOR ART
FIG. 3B PRIOR ART
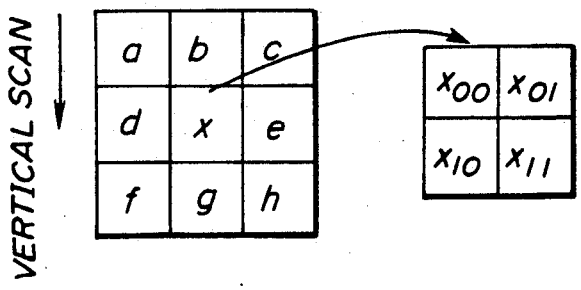

FIG. 8A
FIG. 8B
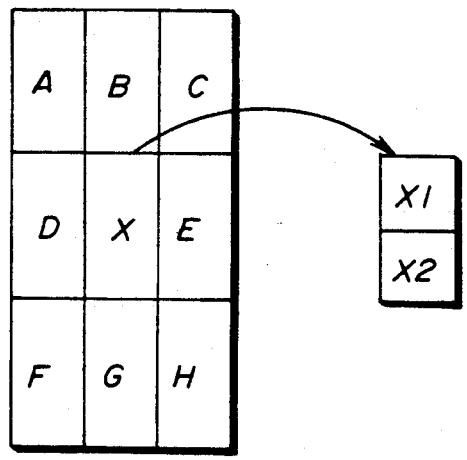
FIG. 8C       FIG. 8D
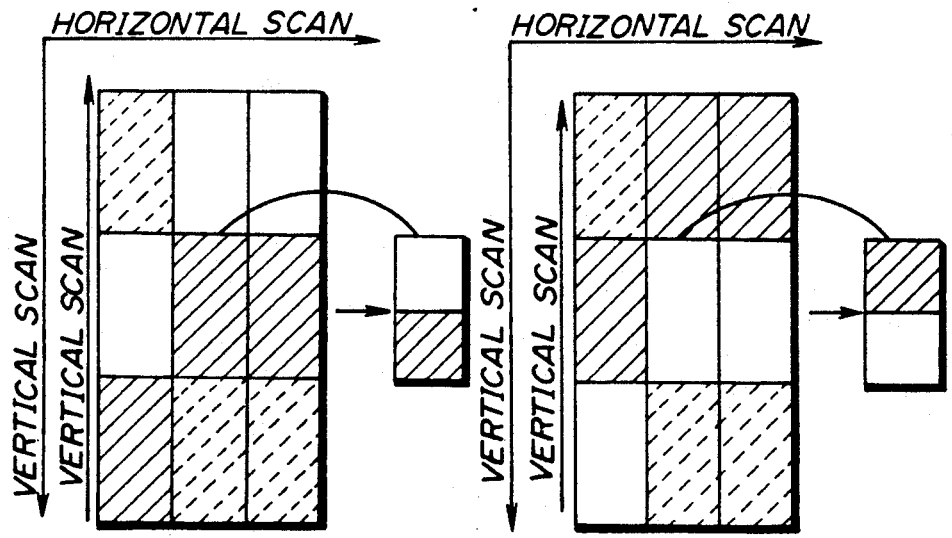

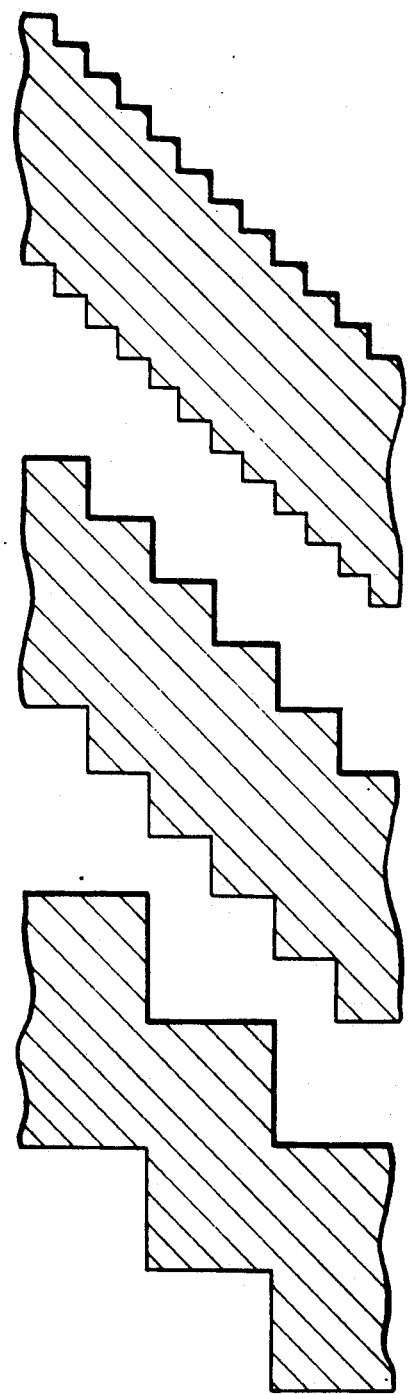

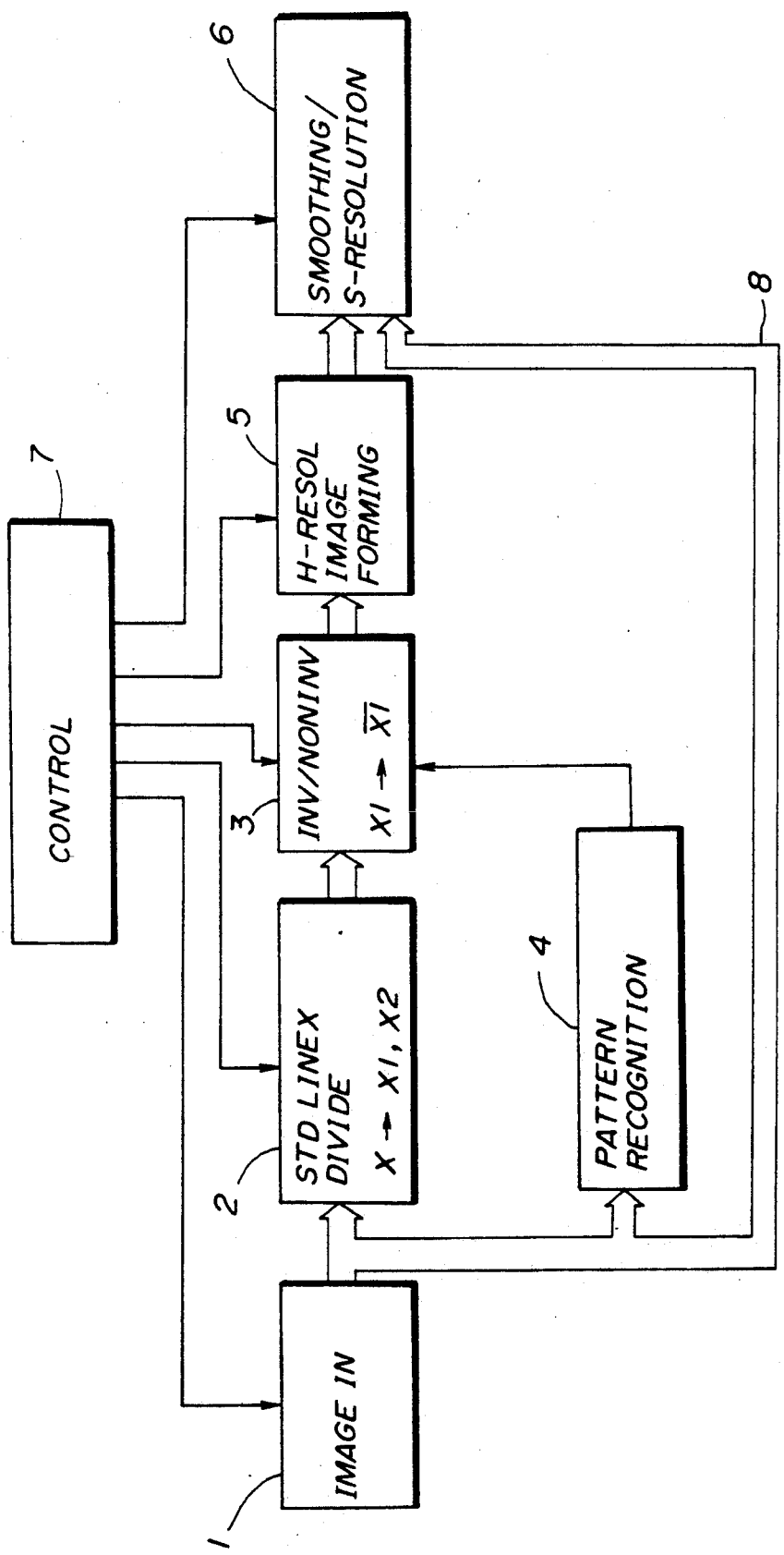

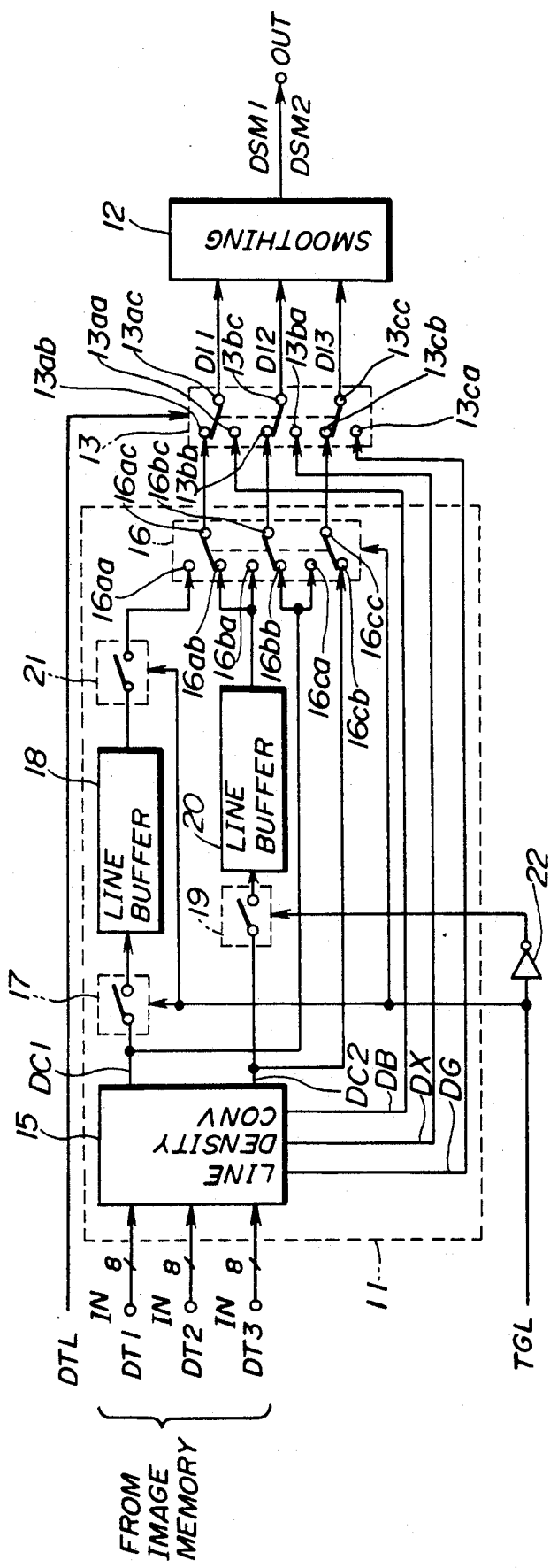

IMAGE PROCESSING METHOD AND SYSTEM

BACKGROUND OF THE INVENTION

The present invention relates to image processing and more particularly to an image processing method and apparatus for converting an image of poor resolution to an image of improved resolution.

In the conventional Group 3 facsimile apparatus, two different resolution mode of images, a standard resolution mode and a fine resolution mode, are used for reading images, wherein the fine resolution mode provides a resolution of image in a vertical scanning direction set twice as high as that of the image of the standard resolution mode.

In such a case, a picture element constituting the image of the standard resolution mode shown in FIG. 1A has a size set such that a size LM1 in the horizontal scanning direction is ⅛ mm and that a size LS1 in the vertical scanning direction is 1/3.85 mm, while a picture element constituting the image of the fine resolution mode shown in FIG. 1B has a size LS2 in the vertical scanning direction which is set to 1/7.7 mm as shown in FIGS. 1A and 1B. Note that the size of the picture element of FIG. 1B in the horizontal direction is LM1 and this size is identical to that of the picture element of FIG. 1A.

Naturally, the fine resolution mode provides an improved resolution when the image is read in the fine resolution mode and reproduced also in the fine resolution mode because of the reduced size of picture element.

Recently, facsimile apparatuses having a capability of reading and recording an image with a resolution increased twice as large as the resolution in the fine resolution mode in both the horizontal scanning direction and the vertical scanning direction are developed and used. Such a mode of resolution will be referred to hereinafter as a super-fine resolution mode.

FIG. 1C shows a picture element used in the super-fine resolution mode. Referring to FIG. 1C, it will be understood that the picture element has a size LM2 in the horizontal scanning direction which is set to 1/16 mm and a size LS3 in the vertical scanning direction which is set to 1/15.4 mm. Thus a further improved quality of picture is achieved with respect to the resolution when the image is read in the super-fine resolution mode and reproduced also in the super-fine resolution mode.

When a facsimile apparatus having a capability of reading and recording an image with the super-fine resolution mode is used to receive a facsimile transmission from another facsimile apparatus which does not have the capability of the super-fine resolution mode but the capability of only the fine resolution mode, the transmitted image has of course the resolution of the usual fine resolution mode and thus, the reproduced image has a size which is demagnified to one half of the original image with respect to the horizontal scanning direction as well as with respect to the vertical scanning direction, when the transmitted image is reproduced as it is.

In order to avoid such an inconvenience of unwanted demagnification of the reproduced image, the facsimile apparatus having the super-fine resolution mode capability usually has an additional capability to magnify the size of the reproduced image twice when reproducing a facsimile image transmitted in accordance with the fine resolution mode.

In such a conventional facsimile apparatus, although an image with the quality of the fine resolution mode is obtained, this image is of course inferior, with respect to the quality, to the images of super-fine resolution mode which the facsimile apparatus is potentially capable of providing. As most of the facsimile apparatuses currently used do not have the capability of super-fine resolution mode because of the high price, the facsimile apparatus having the super-fine resolution mode receives facsimile transmission in most of the time in the standard mode or in the high resolution mode. Thus, there are cases that the user of the facsimile apparatus having the super-fine resolution mode capability feels dissatisfaction about the performance of the facsimile apparatus.

In order to reconcile with the demand by the user to achieve a further improved quality of images even when the facsimile apparatus receives a facsimile transmission with the fine resolution mode, the facsimile apparatus having the super-fine resolution mode conventionally has a capability of so-called smoothing process.

In the smoothing process used for this purpose, an obliquely elongating boundary region defining a boundary between a region consisting of white picture elements and a region consisting of black picture elements and extending with an angle of 45 degrees with respect to the horizontal scanning direction, is processed such that the resolution in this region is converted to that of the super-fine resolution mode.

According to the statistical analysis of images, it is known that the lines extending with an angle of 45 degrees (FIG. 2) with respect to the horizontal scanning direction assumes a proportion of about 50% of the lines in the images when the lines parallel to the horizontal and vertical scanning directions are eliminated. Thus, a substantial improvement on the quality of the reproduced image is expected by such a limited effort.

FIG. 3A shows an example of a field of a fine resolution mode image comprising nine picture elements a, b, c, . . . , g and h therein. Such a field appears at the boundary of the image such that a central picture element x coincides to the boundary. Thus, when the boundary is linear and extending from the lower left to the upper right with the black picture elements in the lower right half and the white picture elements in the upper left half of the field as shown in FIG. 4A, the picture elements c, e, f, g and h become black while picture elements a, b and d become white.

In such a field, the picture element x at the center is converted to the super-fine resolution mode by dividing the picture elements to four small picture elements $x_{00}$, $x_{01}$, $x_{10}$, and $x_{11}$ as shown in FIG. 3B, wherein the small picture element $x_{00}$ is set to white while the other small picture elements $x_{01}$, $x_{10}$, $x_{11}$ are set to black as illustrated in FIG. 4A.

When the central picture element x is white as shown in FIG. 4B together with additional white picture elements at the picture elements c, e, f, g and h and further with black picture elements at the picture elements a, b and d, the smoothing process is performed such that the small picture element $x_{00}$ becomes black while the other small picture elements $x_{01}$, $x_{10}$ and $x_{11}$ remain all white.

When the boundary of image is not forming the angle of 45 degrees with respect to the horizontal scanning direction in correspondence to the line not forming the angle of 45 degrees with respect to the horizontal scanning direction, the entire small picture elements $x_{00}$–$x_{11}$ are set identical to the central picture element x of the field of FIG. 3A.

By moving the field of FIG. 3A along the boundary of the image, the stepwise boundary image in the fine resolution mode shown in FIG. 5B is converted to the super-fine resolution mode shown in FIG. 5B.

In such a prior art facsimile apparatus performing the smoothing process, however, there is a problem in that when a facsimile transmission comes in with the standard resolution mode, the reproduced image has an unwantedly steep slope at where the smoothing process is applied. For example, in a case of FIG. 6A where an image containing an oblique line having an angle of 45 degrees with respect to the horizontal scanning direction comes in in the standard resolution mode, the central picture element x is subjected to smoothing by being divided into the foregoing four small picture elements $x_{00}$–$x_{11}$. As the picture element x as well as other picture elements a–h in FIG. 6A are the picture elements of the standard resolution mode, each of the picture elements therein has a horizontal size of LM1 and a vertical size of LS1 as defined in FIG. 1A. Thus, each of the small picture elements $x_{00}$–$x_{11}$ has a shape expanded twice in the vertical direction as compared to the corresponding picture elements in FIG. 3B and thereby the slope corresponding to the picture element X after the smoothing processing inevitably becomes steep as shown in FIG. 7A in the part surrounded by a broken line. Such a steep part appears in each of the corners X', X'', ... in FIG. 7A and provides an unnatural feeling of the image. In other words, there is a problem in the conventional smoothing process that, when this smoothing is applied to the images of the standard resolution mode, the resultant image is not improved but degraded. Further, such an image is not suited for further conversion to the super-fine resolution mode image as each of the small picture elements is elongated in the vertical scanning direction and the pattern as shown in FIG. 4A or FIG. 4B comprising square picture elements is not obtained after the smoothing.

FIG. 6B and 7B show the case where the black region and the white region are reversed as compared to the case of FIGS. 6A and 6B. In this case, too, a similar undesirable effect is obtained as shown.

SUMMARY OF THE INVENTION

Accordingly, it is a general object of the present invention to provide a novel and useful method and system for image smoothing in a facsimile apparatus wherein the foregoing problems are eliminated.

Another object of the present invention is to provide a method and system for converting an original image of a standard resolution mode to an image of a super-fine resolution mode with an improved quality particularly with respect to oblique lines or edges contained in the original images.

Another object of the present invention is to provide a method and system for converting an original image of a standard resolution mode to an image of a super-fine resolution mode with an improved quality particularly with respect to oblique lines or edges contained in the original images, by once converting the original image to an intermediate image of the fine resolution mode and then converting the intermediate image to the desired image of the super-fine resolution mode.

Another object of the present invention is to provide a method and system for smoothing an image in a facsimile system wherein an original image of the standard resolution mode is converted, when the image contains an oblique boundary extending in an angle of 45 degrees with respect to the horizontal scanning direction, to an intermediate image of the fine resolution mode with a smoothing applied such that a central picture element of the standard resolution mode located on the oblique boundary of the image is divided into a pair of small picture elements of the fine resolution mode, and wherein the content of one of the small picture elements thus obtained at a side of previous horizontal scanning lines with respect to the horizontal scanning line containing the central picture element is inverted. The improved intermediate image of the fine resolution mode thus obtained is further converted to an image of the super-fine resolution mode. According to the present invention, the original image of the standard resolution mode is once converted to the improved image of the fine resolution mode. During this conversion, a smoothing is achieved without forming a steep boundary in correspondence to the picture element of the original image to which the smoothing is applied by dividing the picture element of the original image into an upper small picture element at a side of previous horizontal scanning lines and a lower small picture element at a size of latter a horizontal scanning lines. The smoothing is performed simply by inverting the content of the small picture element in the side of the previous scanning lines. By applying a known smoothing process for the fine resolution mode to the image thus obtained, a further improved image of the super-fine resolution mode is easily obtained.

Other objects and further features of the present invention will become apparent from the following detailed description when read in conjunction with attached drawings.

BRIEF DESCRIPTION OF THE DRAWINGS

FIG. 1 is a drawing respectively showing picture elements in the standard resolution mode, fine resolution mode and the super-fine resolution mode;

FIG. 2 shows an oblique line in an image extending in an angle of 45 degrees with respect to the horizontal scanning direction;

FIGS. 3A and 3B are diagrams showing a procedure of prior art smoothing process applied to a fine resolution mode image;

FIGS. 8A and 8B are diagrams showing the principle of the smoothing process according to an embodiment of the present invention for converting a standard resolution mode image to a fine resolution mode image;

FIGS. 8C and 8D are diagrams showing examples of application of the smoothing process of FIGS. 8A and 8B;

FIGS. 9A, 9B and 9C show an image in the standard resolution mode, an improved image converted from the standard resolution mode to the fine resolution mode, and a further improved image converted from the fine resolution mode to the super-fine resolution mode;

FIG. 10 is a schematical block diagram showing a general construction and principle of a system used in the present invention for converting the original image of the standard resolution mode to the further improved image of the super-fine resolution mode;

FIGS. 11A and 11B and block diagrams showing the system of FIG. 10 in detail;

DETAILED DESCRIPTION

Figure 4A:
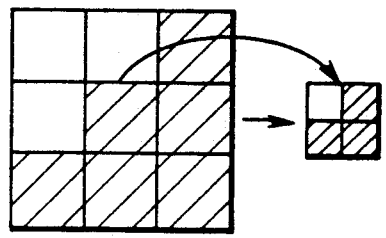
FIGS. 4A and 4B are diagrams showing examples of the smoothing process of FIGS. 3A and 3B as applied to line or edge of the image.

First, the principle of the present invention will be described.

In the present invention, an image in the standard resolution mode is once converted to an intermediate image of the fine resolution mode by dividing each of the picture elements of the standard resolution to a pair of smaller picture elements of the fine resolution mode. Thereby, a detection is made for a part of boundary in the image which has an angle of 45 degrees with respect to the horizontal scanning direction. In response to the detection, the fine resolution image obtained after the conversion is corrected by smoothing such that the boundary maintains the angle of 45 degrees with respect to the horizontal scanning direction.

The foregoing process of converting the original image of the standard resolution mode to the intermediate image of the fine resolution mode will be described with reference to FIG. 8A Referring to FIG. 8A, a field of the original image is divided into nine picture elements of the standard resolution mode arranged in a three row and three column formation with a particular picture element X at the center and eight other picture elements A-H surrounding the picture element.

In a case where there is a boundary of image in the field of FIG. 8A extending with the angle of 45 degrees with respect to the horizontal scanning direction, the central picture element X is either black as shown in FIG. 8C or white as shown in FIG. 8D. Thus, when the central picture element X is black as in the case of FIG. 8C, at least the picture element E immediately adjacent to the picture element X at a right side thereof and the picture elements F at the lower left of the picture element X are set to black while the picture elements A-D above or left of the picture element X are set to white. The picture element G and H hatched by broken line may either be black or white. When the central picture element X is white as in the case of FIG. 8D, on the other hand, at least the picture element E immediately adjacent to the picture element X at a right side thereof and the picture elements F at the lower left of the picture element X are set to white while the picture elements A-D above or left of the picture element X are set to black.

In the smoothing process of the present invention, the central picture element X is divided into a first small picture element X1 and a second small picture element X2 located below the picture element X1. From FIGS. 1A and 1B showing the size of the picture element of the standard resolution mode and the fine resolution mode, it will be understood that the small picture elements X1 and X2 constituting the picture element X of the standard resolution mode have the size of the fine resolution mode.

In the former case where the central picture element X is black, the smoothing process is performed by inverting the content of the small picture element X1 at a side of previous horizontal scanning lines from black to white as shown in FIG. 8A Note that the facsimile transmission proceeds in the direction of arrow indicating the vertical scanning direction. In the latter, case, the content of the small picture element X1 at the side of the previous horizontal scanning lines is inverted from white to black.

The foregoing smoothing process is not applied to the boundary having an angle other than 45 degrees with respect to the horizontal scanning direction. In other words, when the pattern of the boundary is other than those shown in FIGS. 8C and 8D or other than the mirror images of FIGS. 8C and 8D about a hypothetical horizontal or vertical mirror plane set so as to pass through the picture element X, the content of the picture element X is maintained unchanged. As already noted, the proportion of the lines which have an angle other then zero (horizontal), 90 degrees (vertical) or 45 degrees is small and can be ignored without deteriorating the quality of the reproduced image.

As a result of the foregoing smoothing processing, an image of the standard resolution mode shown in FIG. 9A is converted to an image of the fine resolution mode shown in FIG. 9B.

Figure 4B:
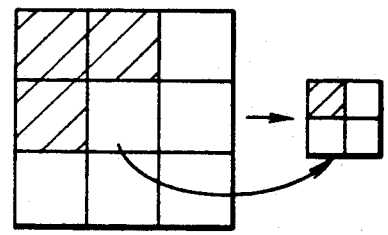
Figure 5A:
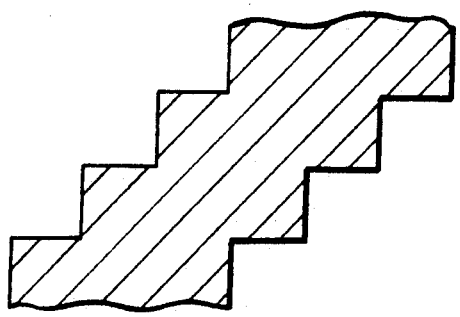
FIGS. 5A and 5B are diagrams respectively showing an oblique line or edge of the fine resolution mode prior to the smoothing and a corresponding line or edge of the super-fine resolution mode after the smoothing according to the prior art process of FIGS. 3A and 3B.
Figure 5B:
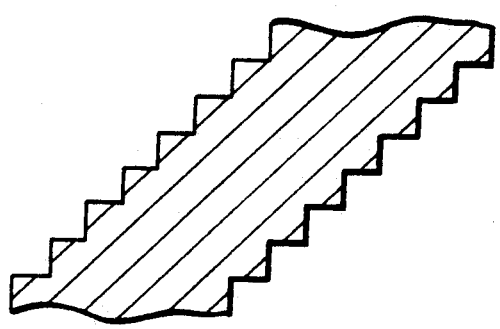

The image of FIG. 9B is then subjected to another smoothing process according to the procedure previously described with reference to FIGS. 4A and 4B. Thereby, the image of FIG. 9B which is the image of the fine resolution mode is converted to an image of the super-fine resolution mode shown in FIG. 9C. Thus, a successful smoothing of image of the standard resolution mode is achieved. Note that a same result is obtained for a line image extending from the lower left to the upper right by carrying out an exactly identical process.

A same conversion is effective also when the direction of the vertical scan is reversed. In this case, however, note that the small picture element X1 of which image content is to be inverted for the smoothing is not in the side of previous horizontal scanning lines but in the side of later horizontal scanning lines. Thus, the small picture element to be inverted has to be chosen depending on the pattern to which the smoothing process is to be applied. Illustration and description for this case will be omitted except for illustrating the reversed vertical scanning direction in FIGS. 8C and 8D, as the process for such a case is obvious from the foregoing description.

Next, a system employed for carrying out the smoothing process of the present invention described previously will be described.

First, the general construction of the system of the present invention will be described with reference to FIG. 10 showing the system by a number of function blocks.

Referring to FIG. 10, a piece of image containing a plurality of lines of the standard resolution mode is read out from an image storing block 1 which may be an image memory storing the image data. The piece of the image thus read out from the image storing block 1 is then supplied to a line dividing block 2, wherein the picture element X at the center of the piece of the image is divided into the small picture element X1 and the small picture element X2. The image corresponding to the small picture elements X1 and X2 are supplied to an inversion/non-inversion block 3 wherein the content of the image in the picture element X1 is inverted under a control signal supplied from a pattern recognition block 4. The pattern recognition block 4 is supplied with the piece of image identical to the one supplied to the line dividing block 2 and produces a control signal upon detection of a predetermined pattern containing the oblique boundary shown in FIG. 8C or FIG. 8D, and the control signal thus produced is supplied to the inversion/non-inversion block 3.

In the inversion/non-inversion block 3, the content of the picture element X1 is inverted when the control signal from the pattern recognition block 4 is high, and the content of the picture elements X1 thus inverted as well as the content of the picture element X2 are supplied to a high-resolution mode image forming block 5 where a fine resolution mode image is synthesized from the images X1 and X2. When the control signal is low, the content of the picture element X1 is supplied to the following block 5 without inversion, together with the content of the picture element X2.

The fine resolution mode image thus synthesized by the fine resolution mode image forming block 5 is then supplied to an image processing block 6 which performs the known smoothing process for converting the fine resolution mode image to the super-fine resolution mode image.

Further, a system controller 7 is provided for controlling the transfer of image data between the function blocks. When the system is to be used for conversion of the fine resolution mode image to the super-fine resolution mode image, the system controller 7 controls that the image data read out from the image storing block 1 such that the image data is transferred to the image processing block 6 directly via a bus 8, bypassing the blocks 2–5. Thus, the system is applicable also for conversion from the fine resolution mode image to the super-fine resolution mode image.

FIGS. 11A and 11B are block diagrams of an image processing system for realizing the image processing system shown schematically in FIG. 10. The image processing system generally comprises an image conversion part 11 for converting the image of the standard resolution mode to the image of the fine resolution mode, a smoothing processing part 12 for converting the image of the fine resolution mode to the super-fine resolution mode, and a switching circuit 13 for selecting the image signal to be supplied to the smoothing processing part 12.

The image conversion part 11 comprises a line density conversion unit 15 which performs the division of the picture element X into the small picture elements X1, X2 (see FIGS. 8A and 8B) upon reception of standard resolution mode image data DT1, DT2 and DT3 representing the image data of three consecutive lines. The unit 15 produces in response to the input image data DT1, DT2 and DT3 an image data DC1 corresponding to the small picture element X1 of the fine resolution mode. This data DC1 is supplied on the one hand to terminals 16bb and 16ca of a three-channel switching circuit 16 and on the other hand to a line buffer 18 having a memory capacity of one line via a switch 17. The image signals DT1, DT2 and DT3 are eight bit data and supplied parallel from an image memory such as the image memory 1 in FIG. 10. In FIG. 11A, the image memory is not illustrated.

The line density conversion unit 15 further produces an image signal DC2 corresponding to the small picture element X2 and this signal DC2 is supplied on the one hand to a terminal 16cb of the switching circuit 16 and on the other hand to another line buffer 20 having a memory capacity of one line of image data.

The foregoing line buffer 18 provides an output image data which is supplied to a terminal 16aa via a switch 21, while the line buffer 20 provides an output image data supplied to terminals 16ab and 16ba of the switching circuit 16.

Further, terminals 16ac, 16bc and 16cc of the switching circuit 16 corresponding to the foregoing stationary contacts are connected respectively to stationary contacts 13ab, 13bb and 13cb of the previously described three channel switching circuit 13. Furthermore, stationary contacts 13aa, 13ba and 13ca of the switching circuit 13 are supplied with image data DB, DX and DG respectively corresponding to the content of the picture element G shown in FIG. 8A. Note that the image data DB, DX and DG are produced by the line density conversion unit 15 in response to the input image data DT1, DT2 and DT3 supplied thereto.

The image processing system of FIG. 11A is controlled by a data transfer controller 19 shown in FIG. 11B which produces control signals DTL and TGL shown in FIGS. 11A and 11B wherein the control signal TGL is set to a logic level H when performing processing of the picture element X1 and such that the signal TGL is set to a logic level L when processing the picture element X2. This signal TGL is supplied to the switches 17 and 21, switching circuit 16, and further to a switch 19 via an inverter 22.

When the signal TGL is in the logic level H, the switches 17 and 21 are turned on and the switching circuit 16 is controlled such that the terminals 16aa, 16ba and 16ca are respectively connected to terminals 16ac, 16bc and 16cc. Further, the switch 19 is turned off. Conversely, when the signal TGL is in the logic level L, the switches 17 and 21 are turned off and the switching circuit 16 connects the terminals 16ab, 16bb and 16cb respectively to the terminals 16ac, 16bc and 16cc. At the same time, the switch 19 is turned on.

Figure 14:
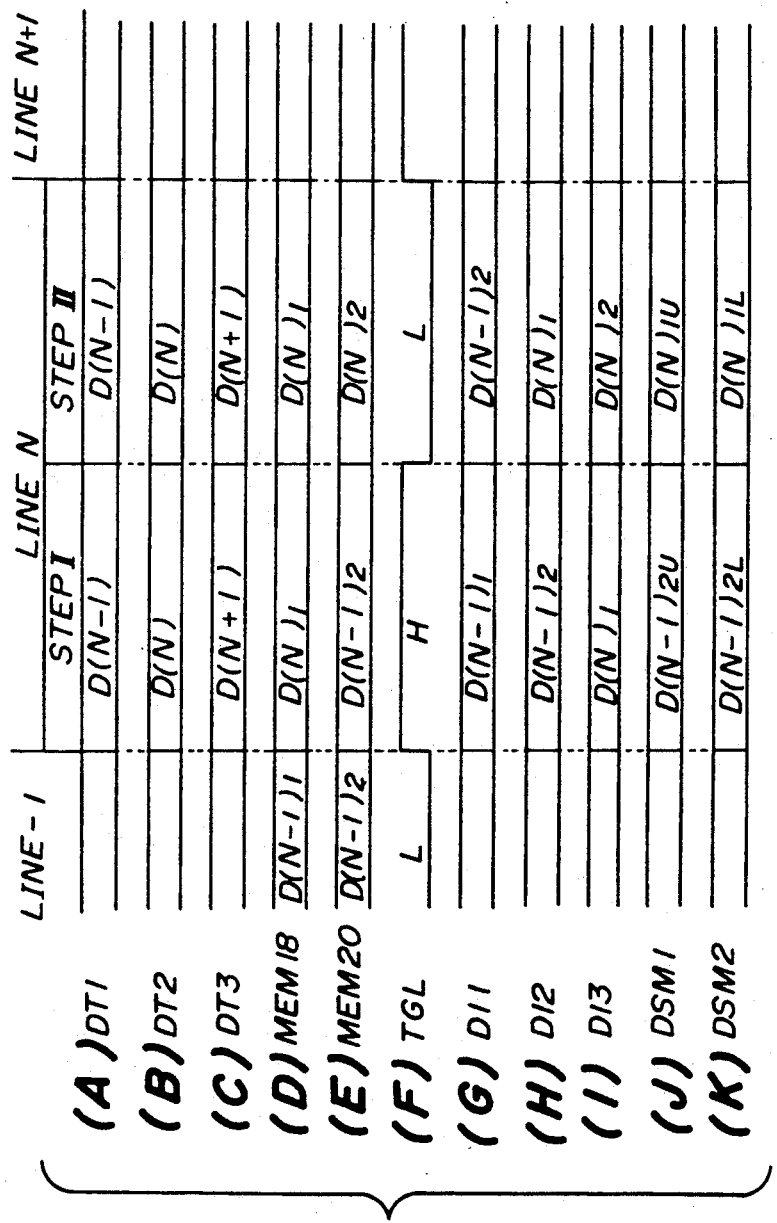
FIG. 14 a diagram showing waveform of various signals in the system of FIG. 11.

The data transfer controller 9 further produces the foregoing signal DTL which assumes a logic level L when processing the images of the standard resolution mode and a logic level H when processing the images of the fine resolution mode, and this signal DTL is supplied to the switching circuit 13. The switching circuit 13 operates such that output signals at the terminals 13ab, 13bb and 13cb are supplied to the smoothing processing part 12 as signals D11, D12 and D13 when the logic level of the signal DTL is L while the signals DB, DX and DG at the terminals 13aa, 13ba and 13ca are supplied to the smoothing processing part 12 as the signals D11, D12 and D13 when the logic level of the signal DTL is H. Detailed operation of the system of FIGS. 11A and 11B under the control of the data transfer controller 19 will be described later with reference to FIG. 14.

Figure 12:
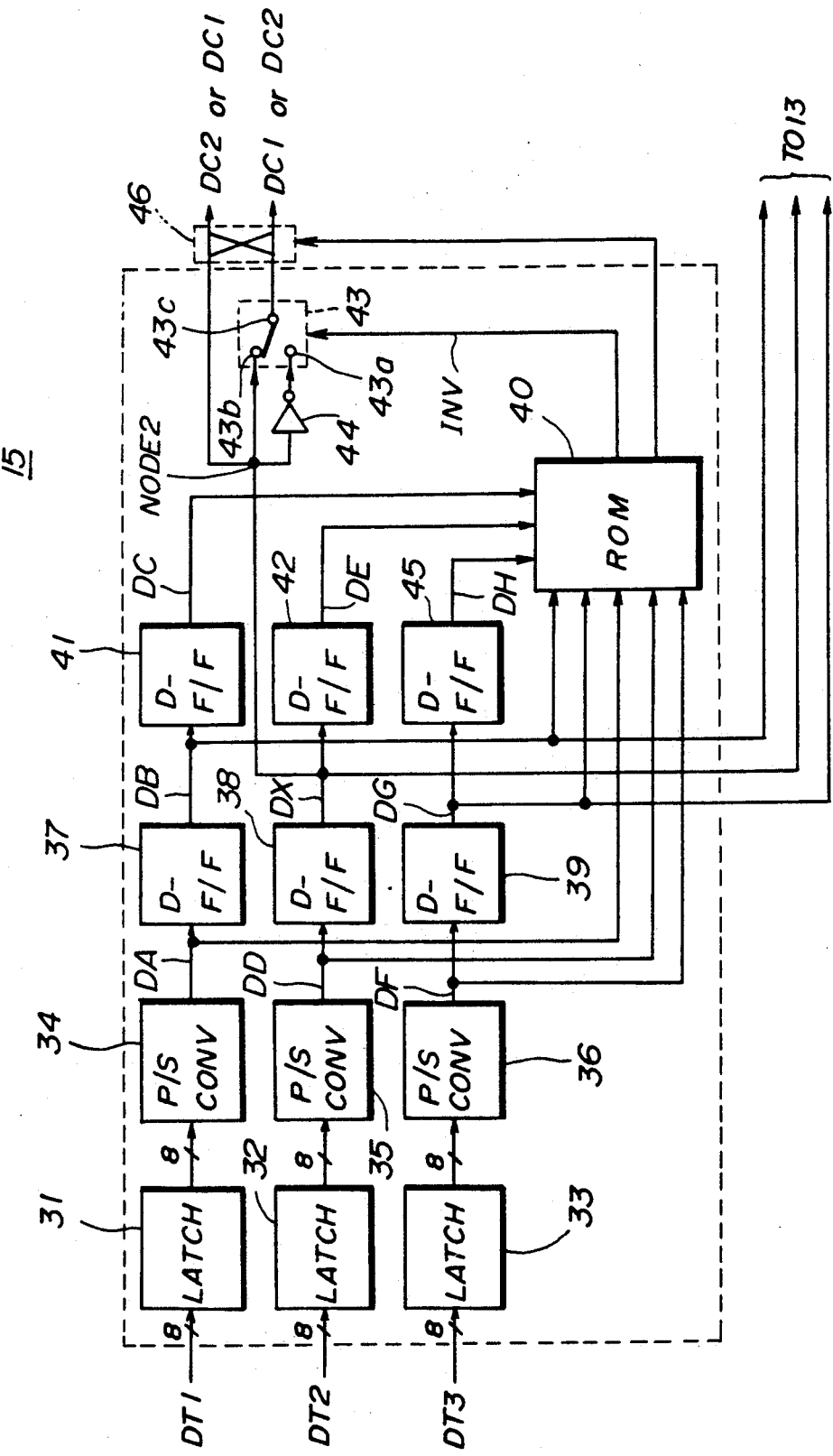
FIG. 12 is a block diagram showing an embodiment of an image processing part used in the system of FIG. 11 and constituting an essential part of the present invention.

Next, the line density conversion unit 15 which constitutes the essential part of the present invention will be described with reference to FIG. 12. In FIG. 12, synchronizing signals such as the system clock and the like are eliminated from illustration because of the simplicity of the drawing.

Referring to FIG. 12, the eight-bit image data such as the data DT1, DT2 and DT3 are first stored in latch circuits 31, 32 and 33 and then supplied to parallel/serial converters 34, 35 and 36.

In the parallel/serial converters 34, 35 and 36, the eight-bit parallel image data from the latch circuits 31, 32 and 33 are converted to serial image data in synchronization to a clock signal supplied thereto, and the serial image data thus obtained in the parallel/serial converters 34, 35 and 36 are supplied respectively to D-type flip-flops 37, 38 and 39 as image data DA, DD and DF respectively representing the content of the picture elements A, D and F adjacent to the central picture element X (see FIG. 8A). Further, the serial image data thus produced are supplied to a picture element conversion part 40 to be described.

In response to the input image data DA, the D-type flip-flop 37 produces an output image data DB corresponding to the content of picture element B (FIG. 8A) and the output image data DB is supplied on the one hand to another D-type flip-flop 41, on the other hand to the picture element conversion part 40, and further to the switching circuit 13.

The D-type flip-flop 38 on the other hand produces an output image data DX corresponding to the content of the central picture element X in response to the input image data DD and supplies the output image data DX, on the one hand to a D-type flip-flop 42, on the other hand to a terminal 43b of a switching circuit 43, and further to a terminal 43a of the switching circuit 43 via an inverter 44, by branching at a node NODE2 corresponding to the function block 2 of FIG. 10. Furthermore, the output image data DX is outputted as the signal DC2 or DC1 described previously after passing through a switch 46 to be described and at the same time supplied to the switching circuit 13.

The D-type flip-flop 39 produces an output image data DG corresponding to the content of the picture element G (FIG. 8A) in response to the input image data DF and supplies the image data DG to a D-type flip-flop 45, the picture element conversion part 40, and further to the switching circuit 13.

Further, the D-type flip-flops 41, 42 and 45 produces respectively output data DC for the picture element C, output data DE for the picture element E and output data DH for the picture element H which are supplied to the foregoing picture element conversion part 40.

The signal at a common terminal 43c of the switching circuit 43 is outputted after passing through the switch 46 to be described as the signal DC1 or the signal DC2 described previously with reference to FIG. 11A.

The picture element conversion part 40 is supplied with the image data DA, DB, DC, DD, DE, DF, DG and DH, and produces a signal INV which is supplied to the switching circuit 43 such that the signal INV assumes a logic level H when the image data DA, DB and DC are "1" indicating that the picture elements A, B and C are white and at the same time the image data DE and DF are "0" indicating that the picture elements E and F ar black. In the rest of the combination, the signal INV is set to a logic level L. In response to the logic level H of the signal INV, the switching circuit 33 is controlled such that the terminal 43c is connected to the terminal 43a while when the logic level of the signal INV is L, the terminal 43c is connected to the terminal 43b.

The picture element conversion part 40 further discriminates the image pattern and produces a control signal for actuating the switch 46. For example, when the image pattern are those shown in FIGS. 8C and 8D, the switch 46 is controlled such that the image data DX or inversion thereof is outputted as the image data DC1 while the image data DX without inversion is outputted as the image data DC2. On the other hand, when the image pattern are the upside down images of FIGS. 8C and 8D as a result of reversed vertical scanning direction, the picture element conversion part 40 controls the switch 46 such that the image data DX or the inversion thereof is outputted as the output image data DC2 and the image data DX not experienced the inversion is outputted as the output image data DC1.

Thus, only when the central picture element X is located on the boundary coincident to the pattern of FIG. 8C which has an angle of 45 degrees with respect to the horizontal scanning direction, the signal DC1 represents an inversion of the image data DX of the central picture element X. Otherwise, the signal DC1 represents the image data DX not with inversion. Note that the image data DX is further supplied to the following circuits as already described with reference to FIG. 11A without inversion as the signal DC2.

Next, the smoothing processing part 12 will be described with reference to FIG. 13. Similarly to the case of FIG. 12, synchronizing signals used in this part such as the system clock signal are omitted from illustration.

Figure 13:
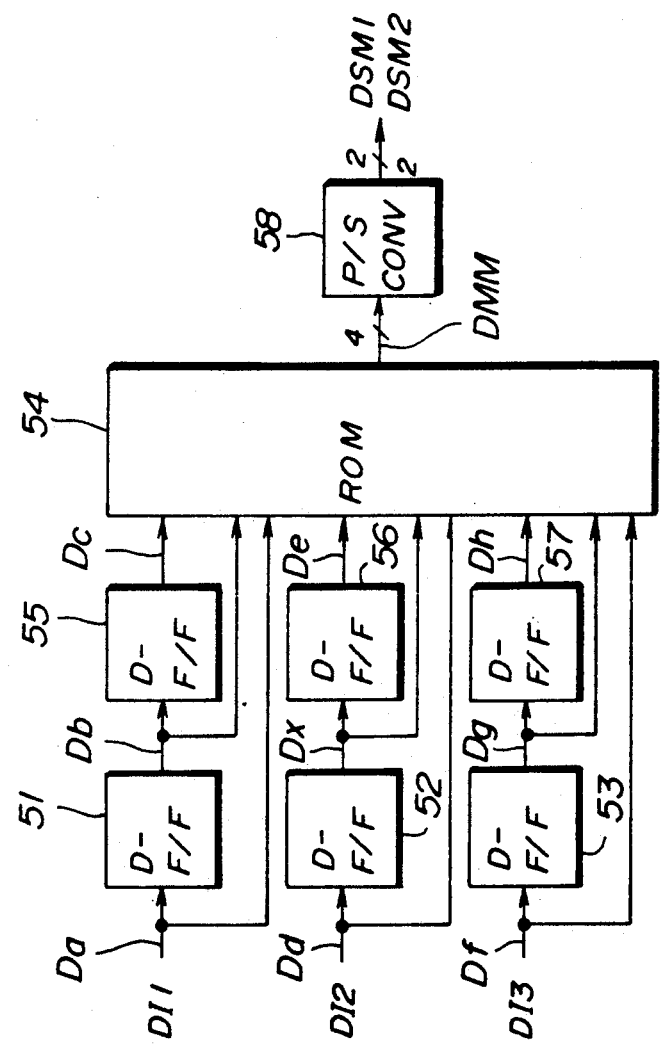
FIG. 13 a block diagram showing an embodiment of a smoothing part used in the system of FIG. 11 for converting the fine resolution mode image to the super-fine resolution mode image.

Referring to FIG. 13 showing an example of the smoothing processing applied when converting an image of the fine resolution mode to an image of the super-fine resolution mode, the signals D11, D12 and D13 respectively representing image data Da, Dd and Df of the fine resolution mode picture elements a, d and f shown in FIG. 3A are supplied to D-type flip-flops 51, 52 and 53. Note that the picture elements a, d and f are located adjacent to the central picture element x of the fine resolution mode. Further, the image data Da, Dd and Df are supplied to corresponding address inputs of a read-only memory (ROM) 54 storing a picture conversion table.

The D-type flip-flops 51, 52 and 53, on the other hand, produce output image data Db, Dx and Dg corresponding to the picture elements b, x and g of the standard resolution mode in response to the input image data Da, Dd and Df, and the output image data Db, Dx and Dg are supplied to D-type flip-flops 55, 56 and 57 respectively as well as to corresponding address input of the ROM 54.

Further, in response to the image data Db, Dx and Dg, the flip-flops 55, 56 and 57 produce output image data Dc, De and Dh respectively representing the picture elements c, e and h and these output image data are supplied to corresponding address inputs of the ROM 54.

The ROM 54 stores the picture element conversion table as already described. This picture element conversion table comprises a four-bit data DMM representing the content of the small picture elements $x_{00}$, $x_{01}$, $x_{10}$ and $x_{11}$ of the super-fine resolution mode (FIG. 3B) by each of the bits therein. The content of the small picture elements $x_{00}$–$x_{11}$ are determined in correspondence to the content of the image data Da–Dh and Dx in accordance with the known smoothing process.

The four-bit data DMM is read out from the ROM 54 under the control of the data transfer controller 19 and is supplied to a parallel/serial converter 58. The parallel/serial converter 58 in turn arranges the four-bit DMM and outputs a first two bit portion and a second two bit portion thereof in series respectively as an output image data DSM1 and an output image data DSM2.

Next, the operation of the system of FIGS. 11A and 11B will be described in detail for an example where an image data of the standard resolution mode at the line N is converted to an image of the super-fine resolution mode.

In the description hereinafter, symbols $(K)_1$ and $(K)_2$ are defined as representing respectively a line obtained by dividing a line K of the standard resolution mode into a pair of lines of the fine resolution mode, wherein the line $(K)_1$ represents one of such lines at a side of previous transmission and a line $(K)_2$ represents the other of such lines in a side of later transmission. In corresponding to the lines $(K)_1$ and $(K)_2$, symbols $D(K)_1$ and $D(K)_2$ are defined as representing the image of these lines. Further, symbols $(L)_{1U}$ and $(L)_{1L}$ are defined as representing lines of the super-fine resolution mode obtained by dividing a line $(L)_1$ of the fine resolution mode, wherein the line $(L)_{1U}$ is located at a side of previous transmission and the line $(L)_{1L}$ is located at a side of later transmission. In correspondence to the lines $(L)_{1U}$ and $(L)_{1L}$, symbols $D(L)_{1U}$ and $D(L)_{1L}$ are defined as the corresponding image data each represented by two bits, one bit corresponding to the picture element $x_{00}$ in the left and the other bit corresponding to the picture element $x_{01}$ in the right. Similarly, the lines $(L)_{2U}$ and $(L)_{2L}$ represent lines of the super-fine resolution mode obtained by dividing a line $(L)_2$. The line $(L)_{2U}$ is located at the side of previous transmission and the line $(L)_{2L}$ is located at the side of later transmission, and symbols $D(L)_{2U}$ and $D(L)_{2L}$ are defined as the corresponding image data each represented by two bits, one bit corresponding to the left picture element $x_{10}$ and the other bit corresponding to the right picture element $x_{11}$.

When converting an image of the standard resolution mode to the image of the super-fine resolution mode, the data transfer controller 19 sets the logic level of the control signal DTL to the level L indicating that the conversion be made from the standard resolution mode to the super-fine resolution mode. In response to the setting of the control signal DTL, the selecting circuit 13 is controlled to a state where the output signals DC1 and DC2 of the line density conversion unit 15 are outputted after passing through the switching circuit 16. This process is illustrated in FIGS. 14D and 14E.

Figure 6B:
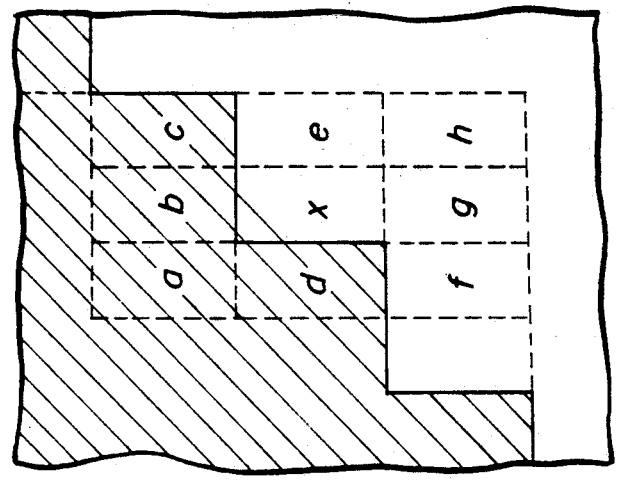
FIGS. 6A and 6B showing the prior art smoothing process as applied to the oblique line or edge image of the standard resolution mode.
Figure 6A:
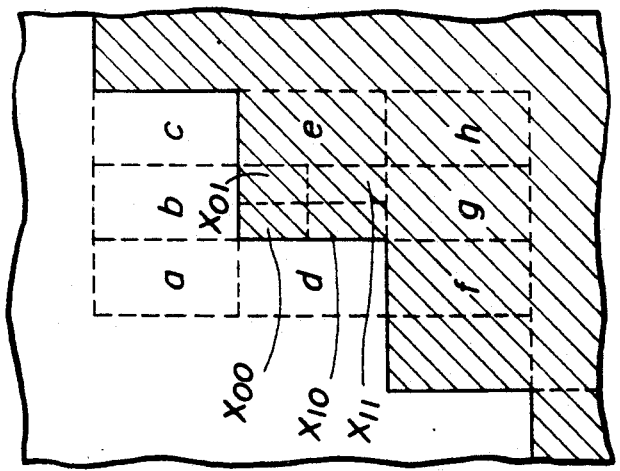
Figure 7B:
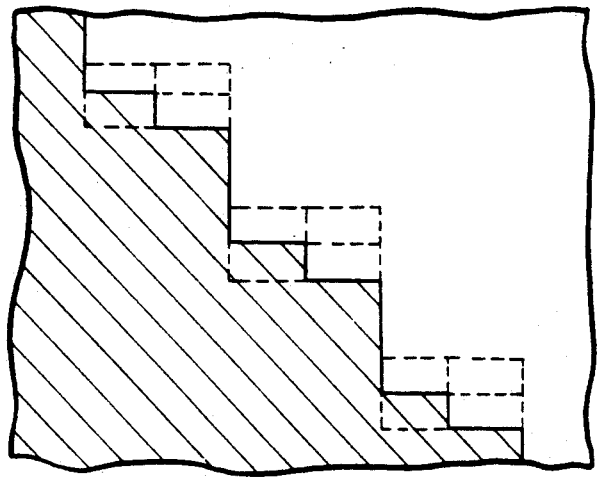
FIGS. 7A and 7B diagrams showing problems arising associated with the use of the prior art smoothing process to the case of the images of the standard resolution mode.
Figure 7A:
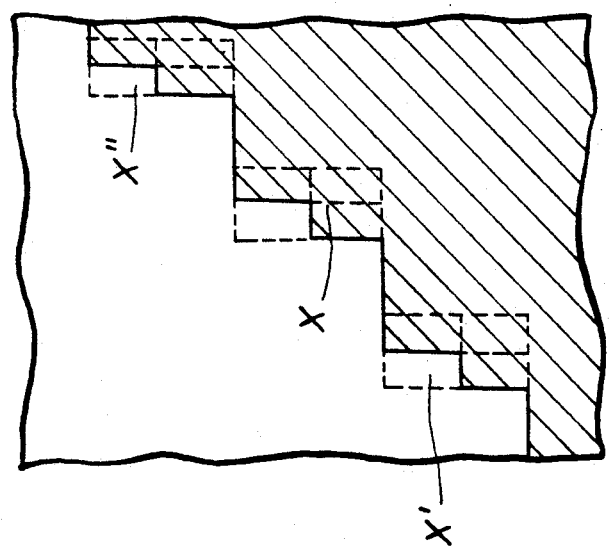

At the beginning of conversion of an image on a line N of the standard resolution mode which appears after a previous line N−1 and before a next line N+1, the data transfer controller 19 at first sets the logic level of the control signal TGL to the level H as shown in FIG. 6F in correspondence to a phase I for the processing of a line $(N)_1$. In response thereto, the switching circuit 16 connected the common terminals 16ac, 16bc and 16cc to the terminals 16aa, 16ba and 16ca respectively and the switches 17 and 21 are turned on while the switch 19 is turned off.

At the same time, the image data D(N−1), D(N) and D(N+1) each being an eight-bit image data of the standard resolution mode and corresponding to the lines (N−1), N and (N+1), are extracted beginning from the starting position of respective lines, and are supplied sequentially to the line density conversion unit 15 under control of the data transfer controller 19 as the image data DT1, DT2 and DT3 as shown in FIGS. 14A, 14B and 14C.

In response to the input of the image data DT1, DT2 and DT3, the line density conversion unit 15 outputs the image data $D(N)_1$ and $D(N)_2$ as the image data DC1 and DC2, wherein the image data DC1 is supplied to the line buffer 18 via the switch 17 which is now turned on in response to the logic level H of the control signal TGL, while the supply of the image data $D(N)_2$ to the line buffer 20 is prohibited at the switch 19 which is turned off. As a result, the content of the line buffer 18 is updated by the image data DC1 which is equal to the image data $D(N)_1$. On the other hand, the content of the line buffer 20 is held unchanged.

Together to the input of the image data DC1 (or (or $D(N)_1$) to the line buffer 18, the content $D(N-1)_1$ of the line buffer 18 previously stored therein as well as the content $D(N-1)_2$ of the line buffer 20 are read out and outputted to the smoothing processing part 12 as the output image data D11 and D12 respectively as shown in FIGS. 14G and 14H via the switching circuit 16 and the switching circuit 13. Further, the image data DC1 itself is outputted as the output image data D13 via the switching circuits 16 and 13 as shown in FIG. 14I. Note that the output image data DI1–DI3 represent the image data of the fine resolution mode.

In response to the output image data DI1–DI3, the smoothing processing part 12 produces output image data of the super-fine resolution mode $D(N-1)_{2U}$ and $D(N-1)_{2L}$ sequentially as the output data DSM1 and DSM2.

The foregoing process is repeated for the entire line length by repeatedly reading the input image data DT1, DT2 and DT3 each of the eight bit format data.

When the foregoing processes are completed, the data transfer controller 19 sets the logic level of the control signal TGL to the level L in correspondence a next phase II for the line $(N)_2$.

In response to the transition of the logic level of the control signal TGL from the level H to the level L, the switching circuit 16 sets the terminals 16ac, 16bc and 16cc respectively in contact switches 17 and 21 are turned off and the switch 19 is turned on.

Under the control of the data transfer controller 19, the image data D(N−1), D(N) and D(N+1) of the standard resolution mode and corresponding to the lines N−1, N and N+1, are supplied to the line density conversion unit 15 as the image data DT1, DT2 lo and DT3. In response to the image data DT1, DT2 and DT3, the line density conversion unit 15 produces the image data $D(N)_1$ and $D(N)_2$ as the output image data DC1 and DC2, similarly to the foregoing case. Further, the output image data DC2 is supplied to the line buffer 20 via the switch 19 which is now turned on because of the low level state L of the control signal TGL. The output image data DC1 is not supplied to the corresponding line buffer 18 in this case because the switch 17 is turned off in this case. In response to the supply of the output image data DC1, the line buffer 20 is updated whereby the content of the line buffer 20 is now changed to the image $D(N)_2$. The line buffer 18 is not updated and maintains the previous content $D(N)_1$.

In response to the supply of the output image data DC2 to the line buffer 20, the previous content of the line buffer 20 is read out and supplied to the switching circuit 16 and further to the switching circuit 13 wherein it is outputted as the output image data DI1. Thus, the output image data DI1 in this case becomes identical to the image data $D(N-1)_2$. See FIG. 14G. At the same time, the output image data DC1 and the output image data DC2 of the line density conversion unit 15 are supplied respectively to the smoothing processing part 12 as the output image data DI2 and DI3. As already noted, the image data DI2 is equal to the image data $D(N)_1$ and the image data DI3 is equal to the image data $D(N)_2$.

These image data DI1–DI3 of the fine resolution mode are supplied to the smoothing processing part 12 where the conversion from the fine resolution mode image to the super-fine resolution mode image is performed and image data of the super-fine resolution mode $D(N-1)_{2U}$ and $D(N-1)_{2L}$ are obtained sequentially as the output signals DSM1 and DSM2.

The foregoing processes for the image data DT1–DT3 are repeated for the entire line of the line N, and when completed, the data transfer controller 19 sets the logic level of the control signal TGL to the level H again for the processing of the next line $N+1$.

Thus, the conversion from the standard resolution mode image data to the super-fine resolution mode image data is made by transferring the image data $D(N-1)$, $D(N)$ and $D(N+1)$ of the standard resolution mode for three consecutive lines $N-1$, $N$ and $N+1$ and at the same time changing the logic level of the control signal TGL in the phase I and phase II under the control of the data transfer controller 19. As a result of the first transfer of the image data in the phase I, the super-fine resolution mode image data for the latter two lines $(N-1)_{2U}$ and $(N-1)_{2L}$ of the super-fine resolution mode, which in turn is derived from the previous line $N-1$ of the standard resolution mode, is obtained, and as a result of the second transfer of the image data, the super-fine resolution mode image data for the following two lines $N_{1U}$ and $N_{1L}$ derived from the line N of the standard resolution mode is obtained. By shifting the combination of three consecutive lines such as a combination of lines $N, N+1, N+2$, a combination of lines $N+1, N+2, N+3, \ldots$, such a conversion can be performed for the images on the entire page.

When converting an image of the fine resolution mode to an image of the super-fine resolution mode, on the other hand, the data transfer controller 19 sets the logic level of the control signal DTL to the level H. In response thereto, the image data DB, DX and DG produced by the line density conversion unit 15 are supplied to the smoothing processing part 12 via the switching circuit 13. At the same time, the data transfer controller 19 transfers image data $C(M-1)$, $C(M)$ and $C(M+1)$ of the fine resolution mode for the lines $M-1$, $M$ and $M+1$ to the line density conversion unit 15 as the image data DT1, DT2 and DT3.

In correspondence to this, image data $C(M-1)$, $C(M)$ and $C(M+1)$ are outputted from the line density conversion unit 15 as the serial image data DB, DX and DG which are then supplied to the smoothing processing part 12 via the switching circuit 13 as the image data DI1, DI2 and DI3.

When the image data DI1, DI2 and DI3 are supplied, the smoothing processing part 12 performs the conversion from the fine resolution mode image to the super-fine resolution mode image similarly to the case of the conversion from the standard resolution mode image data described previously, wherein the output image data DSM1 and DSM2 are obtained. Note that the conversion process performed in the smoothing processing part 12 itself is known as already explained with reference to FIG. 3A, 3B, 4A and 4B.

As described heretofore, the system of the present invention shown in FIGS. 11A and 11B performs the operation illustrated and explained with reference to FIGS. 8A–8D and thereby images of the standard resolution mode are converted once to the images of the fine resolution mode and then converted to the super-fine resolution mode.

It should be noted that the process disclosed herein is not only applicable to the images having the oblique edge of 45 degrees with respect to the horizontal scanning direction, but also for the case where the angle of the oblique edge is other than 45 degrees.

Further, the present invention is applicable not only to the facsimile apparatuses but other image processing systems as long as the relation between the standard resolution mode, fine resolution mode and the super-fine resolution mode is maintained similarly with respect to the size of the picture element.

Further, the present invention is not limited to the embodiments described heretofore but various variations and modifications may be made without departing from the scope of the invention.

What is claimed is:

1. A method for converting a first image of a first resolution wherein the first image is represented by first picture elements each having a first size in a first direction and a second size in a second direction different from the first direction, to a second image of a second, improved resolution wherein the second image is represented by second picture elements each having a third size identical to the first size in the first direction and a fourth size which is one-half of the second size in the second direction, comprising steps of:

detecting a predetermined pattern in the first image, said predetermined pattern containing a stepped boundary defining a region formed by a first group of the first picture elements each having a first content and a second group of the first picture elements each having a second content different from the first content, said predetermined pattern including at least a central picture element having the first content and which is formed by the first picture element, said central picture element being defined by a first edge extending in the first direction and a second edge extending in the second direction, a first neighboring picture element formed by the first picture element and is located at a side of the central picture element beyond the first edge with a contact to the central picture element at the first edge, said first neighboring picture element having the second content, and a second neighboring picture element formed by the first picture element and having the second content, said second neighboring picture element being located at a side of the central picture element beyond the second edge in the first direction with a contact to the central picture element at the second edge;

dividing said central picture element into a first sub-picture element and a second sub-picture element each having a size of the second picture element such that the first sub-picture element is located at a side of the first edge and that the second sub-picture element is located at a side away from the first edge in the second direction; and inverting the content of one of the first and second sub-picture elements depending on the detected predetermined pattern.

2. A method a claimed in claim 1 in which said central picture element is further defined by a third edge away from and opposing to the second edge in the first direction and a fourth edge away from and opposing to the first edge in the second direction, wherein said predetermined pattern further contains a third neighboring picture element of the first content at a side of the central picture element away from the second edge in the first direction such that said third neighboring picture element maintains a contact to the central picture element at the third edge of the central picture element, a fourth neighboring picture element of the first content disposed beyond the second edge with respect to the first direction and disposed beyond the fourth edge with respect to the second direction with a contact to the central picture element at an intersection of the second and fourth edges, and a fifth neighboring picture element of the second content disposed beyond the first edge in the second direction and beyond the third edge in the first direction with a contact to the central picture element at an intersection of the first edge and the third edge, and wherein the content of the first sub-picture element is inverted in the step of inversion when the predetermined pattern is detected.

3. A method as claimed in claim 2 in which said first image is supplied line sequentially as a repetition of horizontal scanning lines each comprising a row of the first picture elements extending in the first direction, and said first sub-picture element is located at a side of previous horizontal scanning lines with respect to the second sub-picture element.

4. A method as claimed in claim 2 in which said first image is supplied line sequentially as a repetition of horizontal scanning lines each comprising a row of the first picture elements extending in the first direction, and said first sub-picture element is located at a side of later horizontal scanning lines with respect to the second sub-picture element.

5. A method for converting a first image of a first resolution wherein the first image is represented by first picture elements each having a first size in a first direction and a second size in a second direction different from the first direction, to a second image of a second, improved resolution wherein the second image is represented by second picture elements each having a third size which is one-half of the first size in the first direction and a fourth size which is one-fourth of the second size in the second direction, comprising steps of:

detecting a predetermined pattern in the first image, said predetermined pattern containing a stepped boundary defining a region formed by a first group of the first picture elements each having a first content and a second group of the first picture elements each having a second content different from the first content, said predetermined pattern including at least a central picture element having the first content and formed by the first picture element, said central picture element being defined by a first edge extending in the first direction, a second edge extending in the second direction, a third edge away from and opposing to the second edge in the first direction, and a fourth edge away from and opposing to the first edge in the second direction, a first neighboring picture element formed by the first picture element and is located at a side of the central picture element beyond the first edge with a contact to the central picture element at the first edge, said first neighboring picture element having the second content, a second neighboring picture element formed by the first picture element and having the second content, said second neighboring picture element being located at a side of the central picture element beyond the second edge in the first direction with a contact to the central picture element at the second edge, a third neighboring picture element of the first content at a side of the central picture element away from the second edge in the first direction such that said third neighboring picture element maintains a contact to the central picture element at the third edge of the central picture element, a fourth neighboring picture element of the first content disposed beyond the second edge with respect to the first direction and disposed beyond the fourth edge with respect to the second direction with a contact to the central picture element at an intersection of the second and fourth edges, and a fifth neighboring picture element of the second content disposed beyond the first edge in the second direction and beyond the third edge in the first direction with a contact to the central picture element at an intersection of the first edge and the third edge;

dividing said central picture element into a first sub-picture element and a second sub-picture element each having a fifth size identical to the first size in the first direction and a sixth size which is one-half of the second size in the second direction such that the first sub-picture element is located at a side of the first edge and that the second sub-picture element is located at a side of the fourth edge away from the first edge with respect to the first sub-picture element;

inverting the content of the first sub-picture element when the predetermined pattern is detected;

dividing the first sub-picture element into four small picture elements arranged in two-row and two-column formation each having the size of the second picture element; and inverting the content of one of the small picture elements in contact to the second sub-picture element and in contact to the third neighboring picture element.

6. A system for converting a first image of a first resolution wherein the first image is represented by first picture elements each having a first size in a first direction and a second size in a second direction different from the first direction, to a second image of a second, improved resolution wherein the second image is represented by second picture elements each having a third size which is one-half of the first size in the first direction and a fourth size which is one-fourth of the second size in the second direction, comprising:

image data extraction means supplied with the first image line sequentially for producing an image data containing therein contents of a predetermined number of the first picture elements in row and column formation;

image recognition means supplied with the image data for detecting a predetermined pattern in the image data, said predetermined pattern containing a stepped boundary defining a region formed from a first group of the first picture elements each having a first content and a second group of the first picture elements each having a second content different from the first content, said stepped boundary including at least a central picture element having the first content and which is formed by the first picture element, said central picture element being defined by a first edge extending in the first direction, a second edge extending in the second direction, a third edge away from and opposing to the second edge in the first direction, and a fourth edge away from and opposing to the first edge in the second direction, a first neighboring picture element formed from the first picture element and is located at a side of the central picture element beyond the first edge with a contact to the central picture element at the first edge, said first neighboring picture element having the second content, a second neighboring picture element formed by the first picture element and having the second content, said second neighboring picture element being located at a side of the central picture element beyond the second edge in the first direction with a contact to the central picture element at the second edge, a third neighboring picture element of the first content at a side of the central picture element away from the second edge in the first direction such that said third neighboring picture element maintains a contact to the central picture element at the third edge of the central picture element, a fourth neighboring picture element of the first content disposed beyond the second edge with respect to the first direction and disposed beyond the fourth edge with respect t the second direction with a contact to the central picture element at an intersection of the second and fourth edges, and a fifth neighboring picture element of the second content disposed beyond the first edge in the second direction and beyond the third edge in the first direction with a contact to the central picture element at an intersection of the first edge and the third edge;

picture element dividing means supplied with the image data for dividing said central picture element into a first sub-picture element and a second sub-picture element each having a fifth size identical to the first size in the first direction and a sixth size which is one-half of the second size in the second direction such that the first sub-picture element is located at a side of the first edge and that the second sub-picture element is located at a side of the fourth edge away from the first edge in the second direction with respect to the first sub-picture element, said picture element dividing means producing a first output image data carrying the content of the first sub-picture element and a second output image data carrying the content of the second sub-picture element;

inversion means supplied with the first output image data from the picture element dividing means for producing an output image data such that the output image data produced becomes an inversion of the content of the first sub-picture element when the image recognition means has detected the predetermined pattern and that the output image data becomes the content of the first sub-picture element not with the inversion when the image recognition means has detected a pattern not equal to the predetermined pattern;

intermediate image forming means supplied with the output image data from the inversion means and further with the second output image data from the picture element dividing means for producing an intermediate image data formed by picture elements each having the fifth size in the first direction and the sixth size in the second direction; and smoothing means supplied with the intermediate image data from the intermediate image forming means for producing the second image in response to the content of the intermediate image data supplied thereto.

* * * * *